United States Patent [19]
Parnes

[11] 3,859,053
[45] Jan. 7, 1975

[54] RECOMBINER FOR DISSOCIATED HYDROGEN AND OXYGEN

[75] Inventor: Marvin Jay Parnes, Norwalk, Conn.

[73] Assignee: Universal Oil Products Company, Des Plaines, Ill.

[22] Filed: Oct. 27, 1972

[21] Appl. No.: 301,698

[52] U.S. Cl............... 23/288 R, 23/281, 23/277 C, 62/3, 176/16, 176/37, 423/580
[51] Int. Cl................................................ B01j 9/04
[58] Field of Search . 23/288 R, 288 M, 281, 277 C; 62/3; 176/16, 37; 423/580

[56] References Cited
UNITED STATES PATENTS

| | | | |
|---|---|---|---|
| 2,085,586 | 6/1937 | Hotchkiss | 23/281 |
| 2,492,407 | 12/1949 | Tomany | 23/288 M |
| 2,615,062 | 10/1952 | Craig | 23/288 R |
| 3,212,274 | 10/1965 | Eidus | 62/3 |

Primary Examiner—James H. Tayman, Jr.
Attorney, Agent, or Firm—James R. Hoatson, Jr.; Philip T. Liggett; William W. Page, II

[57] ABSTRACT

A compact tubular-form reactor-condenser system is provided for use with a nuclear container to effect the recombining of dissociated $H_2$ and $O_2$ and preclude the build-up of $H_2$ in such container. A pumping means and preheating means insure the passage of heated gaseous components through an all metal catalyst containing zone at suitable reaction and non-condensing conditions to form water vapor, while a subsequent passage through an adjacent or contiguous cooling zone provides for the condensation of the resulting vapor into liquid water for return to the container means. A preferred arrangement has thermal barrier means incorporated to prevent heat conduction from the reaction zone to the condensation section so as to assist in maintaining the latter section as cool as possible.

6 Claims, 3 Drawing Figures

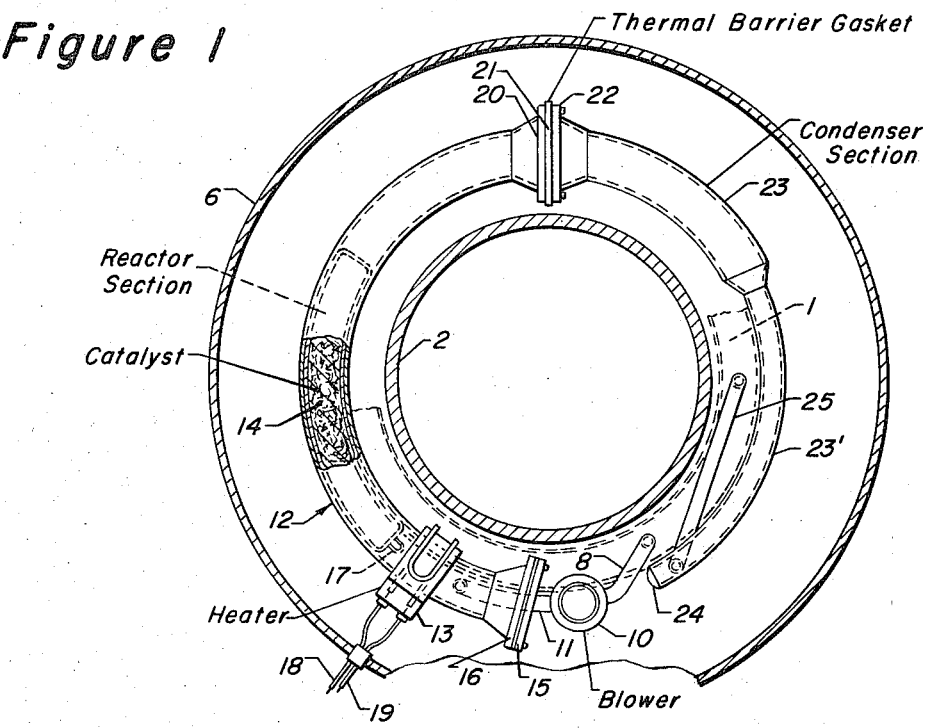
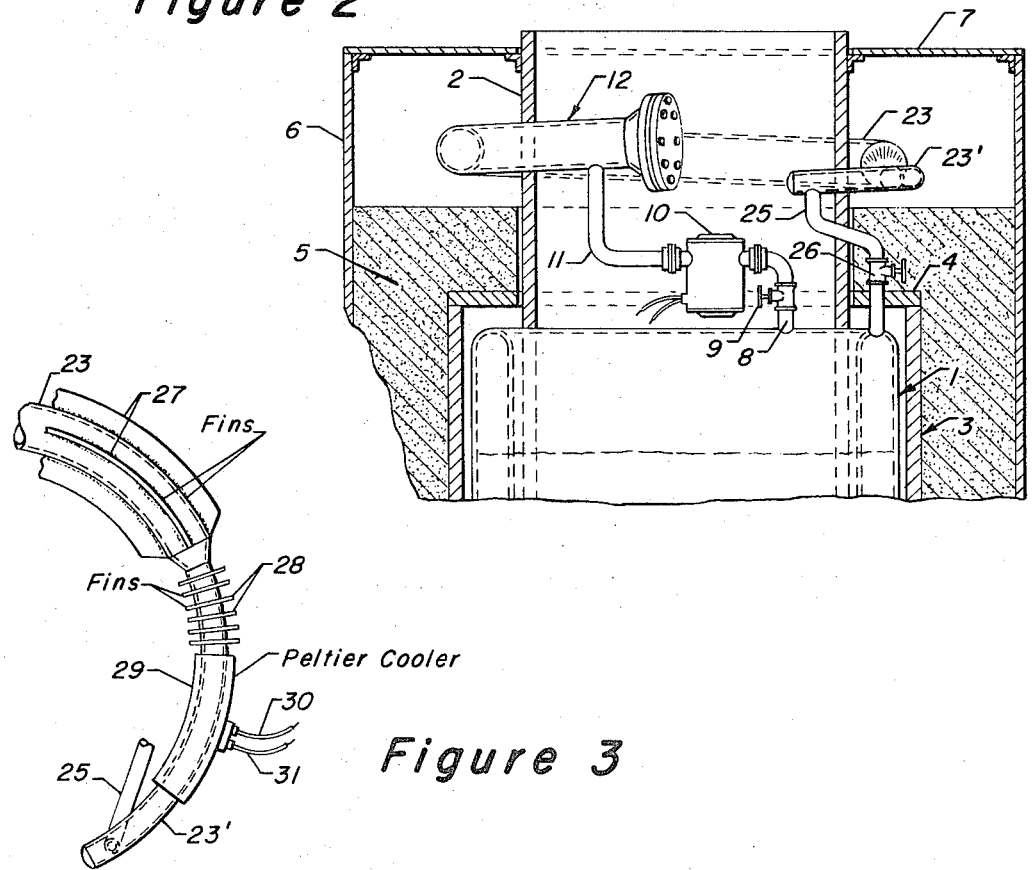

RECOMBINER FOR DISSOCIATED HYDROGEN AND OXYGEN

The present invention relates to providing a method and means for efficiently and compactly arranging to recombine dissociated hydrogen ($H_2$) and oxygen ($O_2$) into water vapor for return to a containment zone for nuclear material.

More particularly, there is provided a tubular-form recombiner system incorporating a gas pervious all metal catalyst mat or bed in a tubular reactor section, means for pumping and heating the gases for passage through the reactor section and on through a connecting tubular-form cooling section, as well as providing a thermal barrier means between the two adjacent sections in order to preclude heat transfer to the cooling zone and thereby minimize cooling requirements for such zone.

In connection with the shipping of nuclear materials, as well as with the stationary utilization of nuclear energy, there can be a problem in the handling or removal of dissociated gaseous components, particularly $H_2$ and $O_2$. For example, one system for transporting used nuclear material converts such material into a liquid nitrate, i.e., plutonium nitrate, which is in a shielded container having an annular configuration. This container is, in turn, in a protective housing and is adapted to be handled and moved in an upright position. However, along with careful movement, or even with no movement of the container, there is some continuous radiological action which results in the formation of $H_2$ and $O_2$ as well as minor amounts of other gaseous or vaporous materials. Since the volumetric production of gas from the nitrate solution in the containment vessel is low, it has seemed appropriate to utilize a catalytic system to treat the gases and obtain a relatively high efficiency in recombining $H_2$ and $O_2$ into water vapor that can be returned directly to the shipping vessel.

Thus, it may be considered a principal object of the present invention to provide an improved form of compact system which can be positioned directly above and in conjunction with a container means for the radioactive material.

It may be considered a further object of the present invention to provide for the improved handling of dissociated gases through an elongated tubular-form catalyst-condensation system such that there is optimum use of catalyst and the preclusion of the conduction of heat to a substantially contiguous cooling section.

It is still another object of the invention to provide for the utilization of electrical power to effect the necessary preheating of the feed gases to, in turn, carry out the desired recombining reaction and to preclude condensation of resulting water vapor in the catalyst material. Also, as may be deemed necessary, there can be the utilization of electrical energy in the novel manner of Peltier cooling to effect a heat exchange type of cooling along a downstream portion of the condensation section of the system.

The present invention provides a compact tubular-form catalytic recombiner unit, particularly adapted to return resulting water condensate to the upper end of a containment vessel having radiologically formed $H_2$ and $O_2$, which comprises in combination: (a) a tubular reactor section having inlet and outlet means thereto and containing gas pervious all metal catalytic material for recombining $H_2$ and $O_2$; (b) a heater means in contact with the inlet end portion of said reactor section to heat incoming gaseous components; (c) a gas-vapor pumping means connective with the inlet means to said reactor section; (d) a tubular-form vapor condensation section directly adjacent to and in an insulated connection with the outlet end of said reactor section; (e) with said insulated connection incorporating at least one non-conductive barrier means interposed between the outlet of the reactor section and the inlet to said vapor condensation section; (f) cooling means connective with said vapor condensation section to provide for resulting liquid $H_2O$; and (g) condensate outlet means from the latter section whereby to return $H_2O$ to the containment vessel.

In the placement and operation of the unit, the reactor and condensation sections may be positioned directly above the nuclear containment vessel such that released $H_2$ and $O_2$ could rise upwardly through the reactor section and then pass onto a condensation section to utilize a natural, non-powered flow through the entire system. On the other hand, a preferred arrangement will utilize a blower or other pumping means to suck the gaseous components from the upper portion of the containment vessel and provide some degree of positive pressure in moving the gases through the reactor section and into the cooling-condensing section whereby resulting condensate may then flow by gravity back into the containment vessel. The forced circulation will also be of advantage in precluding local pockets of $H_2$ from building up from within the upper portion of the containment vessel.

With regard to the heating of the incoming gaseous stream for the reactor section, there may, of course, be various types of heating means utilized to effect the desired minimum temperature level within the unit. For example, electrical heater means encompassing at least a part of the exterior of the inlet section to the tubular-form reactor section may well be utilized to conduct heat into the interior of the tube and heat the gaseous components to a desired temperature level for carrying out recombination reaction in the presence of the catalyst bed and at the same time avoiding condensation of moisture on the catalyst. Typically, electrical heating means can be supplied in small compact arrangements and can provide the necessary temperature level for the present method of operation; however, heating coils or jackets accommodating a suitably heated fluid stream may well be utilized to provide the desired heating of the inlet stream to the reactor section. Where the system is to be portable, the heater coil can use electrical energy from a 12 volt battery. Generally, the gaseous stream should be at a temperature of at least about 150°F. in order that there be catalytic recombination of the $H_2$ and $O_2$ as well as prevention of condensation. On the other hand, the required temperature level for the incoming gaseous stream might well be about double the aforesaid temperature under cold weather conditions in order to insure no condensation within the catalyst section.

Various types of catalytic materials may be utilized to carry out the recombination of $H_2$ and $O_2$ to form water vapor; however, in the present type of system where it may be used as part of a mobile arrangement, then it is particularly necessary to have the catalytic material in a form which will not readily undergo breakage from handling or from jarring conditions, as well as have a material which can resist the presence of water vapor or even water droplets in the event of accidental condensation conditions. Thus, in a preferred embodiment of the present invention, there will be utilized an all metal catalyst such as may be provided from the coating of alloy metal ribbon or wire by an active catalytic component. Platinum, palladium, or a combination of such materials, have been found to be of particular advantage as active catalyst components to be coated onto a suitable temperature resistive support material and carry out an efficient $H_2$ and $O_2$ recombination reaction. Other catalytic components from the Group VIII metals of the Periodic Table may also be used to advantage. In addition, reference may be made to U.S. Pat. Nos. 2,658,742 and 2,720,494 which teach the preparation and use of all metal catalyst elements where there is the coating or plating of alloys of chromium, nickel and iron. Other alloy base materials which are heat resistant may also be used to advantage, as for example an alloy comprising chromia, aluminum and iron. Typically, the all metal alloy catalysts, which have been heretofore produced, utilize crimped thin alloy ribbon which in turn is formed into a gas pervious mat by the random placement of short lengths of crimped ribbon held between confining alloy screens such that the resultant element appears to be similar to a typical air filtering type of unit. On the other hand, relatively fine alloy wire might well be utilized in short coiled configurations such that a multiplicity of small springy, coiled pieces that can be coated or plated with platinum, palladium or other activate component and form resulting small catalyst elements to be packed within a screen or perforated container in the manner of handling packing materials such as berl saddles, raschig rings and the like. The advantage of the small catalyst elements is that they may be poured and handled in a manner of particulated or "pelletized" catalyst in effecting the placement or removal of the catalyst from a given container. In any event, in connection with the present tubular form of recombiner system, it is desired that the catalyst portion of the reactor section be constructed and arranged such that the catalyst may be inserted into and withdrawn from an end portion of the tubular reactor section in order to obtain the placement of the catalyst material.

In connection with the condensation section of the unit, there may be various types of cooling means to assist the condensation of the vapor such that liquid water may be returned to the containment vessel. In a simplified arrangement, merely extended surface area, fins, ribs, and the like may well be utilized to provide the desired condensation; however, for warm weather conditions or certain confined installations, it may be desired to use cooling coils or other heat exchange arrangements to enhance temperature reduction and provide for the desired rapid condensation of water vapor. In still another arrangement, a Peltier type cooler, which utilizes dissimilar metals or semi-conductor means with electrical energy to provide cooling in a manner inverse to that of the typical thermal electric effect, will permit compact cooling means for encompassing at least a portion of the condenser section of the system. A Peltier cooler using electrical power from a battery may be of advantage in connection with a portable recombiner system.

A preferred embodiment of the present invention will also provide suitable thermal gasketing means, or a non-conducting spool means, interposed between the juncture of the tubular-form reactor section and the co-extensive tubular-form condenser section such that there is no transfer of heat from the higher temperature reactor section into the condenser section.

Reference to the accompanying drawing and the following description thereof will serve to illustrate a simplified embodiment of the present improved compact form of recombiner system to carry out the combining of $H_2$ and $O_2$ into water vapor as may be utilized in combination with a container means accommodating nuclear materials.

FIG. 1 of the drawing is a plan view of a circular form tubular type recombiner system illustrating the use of such system in combination with a shipping container for nuclear material.

FIG. 2 of the drawing is a partial elevational view, also partially in section, indicating the utilization of the present tubular-form recombiner system positioned above and joined with a vertically oriented containment vessel of annular form.

FIG. 3 of the drawing is a partial plan view showing modifications to the cooler-condenser section to indicate fin means and electrically powered cooling means integrated with the tubing of the cooling section to enhance the desired condensation of water vapor.

Referring now to FIGS. 1 and 2 of the drawing, there is indicated a portion of an annular-form vessel or container 1, which for example could be utilized for storing or transporting plutonium nitrate solution, or other nuclear material, which would cause $H_2$ and $O_2$ to be dissociated or otherwise evolved from the solution. The vessel 1 is in turn shown as being retained between suitable neutron shield members, such as the inner cylinder-form member 2 and the outer cylinder-form member 3. An annular ring 4 is also indicated as extending between the upper extremity of outside shield 3 and the exterior of the cylindrical shield 2. Positioned around the cylindrical shield 3 there is shown a resilient foam material 5, such as phenolic foam, whereby there is a protective barrier around the containment vessel to preclude damage to the latter in the event of the tipping or jarring of such vessel during the shipping or placement operations. Additionally, there is indicated an encasing chamber or housing 6, with top cover means 7, to surround the foam material 5 as an outside protective wall or barrier member.

The upper portion of the nuclear containment vessel 1 is provided with a vapor outlet line 8 in turn having valving means 9 to transmit dissociated $H_2$ and $O_2$ into blower means 10 whereby there is provided a suitable motive force to pass the gaseous components on through tubing 11 into the inlet end portion of reactor section 12. The incoming gaseous stream is then pushed through the heating section as provided by heater means 13 into a catalyst section 14 which, in turn, extends through a substantial portion of the reactor section in order to provide adequate contact with the gaseous components to be recombined at catalytic recombining conditions into water vapor. For simplicity, there is indicated an electrical type heater means 13 suitable for wrapping around or otherwise encompassing the inlet end of the reactor section 12 and effecting a desired level of heat input for the incoming gas stream such that there may be an efficient recombining of the $H_2$ and $O_2$ in the presence of the catalyst 14 into the desired water vapor for subsequent passage into a condensing section. Electrical wires 18 and 19 are illustrated passing through casing 6 from heater means 13 in order to provide suitable electrical energy to the latter. As hereinbefore noted, the energy might well be supplied from a 12 volt battery where portability is a factor.

Also, as pointed out briefly hereinbefore, the catalyst 14 for the reactor section will preferably comprise an all metal catalyst construction with a suitable active coating capable for effecting the desired recombining reaction between $H_2$ and $O_2$ at an elevated temperature. Typically, the catalyst will be provided in tubular form within screening or other encasing means permitting the slidable insertion of the catalyst into the tubular-form reactor section 12, as well as permit removal thereof in the event that it is desired to have the catalyst replaced or reactivated. Thus, there is indicated a ring means 17, or the like, to effect the gripping of the end of the catalyst section 14 within tubular section 12.

The inlet end portion of the reactor section 12 is provided with a blind flange 15 which in turn bolts or otherwise connects to flange member 16 such that there is, in effect, removable cover means to provide for the insertion and removal of the catalyst section 14. At the downstream end of the reactor section 12 there is indicated a suitable flange member 20 and suitable insulating gasket means 21 between the latter and an accompanying flange member 22 on the condenser section 23. The gasket 22, or other thermal barrier means, should be of an asbestos composition or other non-conductive type of material which will preclude heat conduction from one section to the other. It is, of course, not intended to limit the present improved construction or arrangement to any one type of thermal barrier gasket or non-conductive means inasmuch as various types of insulating spools, or multiple layer gasket means, might well provide a desirable form of thermal barrier between the reactor and condenser sections. In FIG. 1, the condenser section is indicated as having a smaller diameter downstream portion 23' which in turn has a blanked-off end portion 24 to preclude straight-through flow of the condensed water vapor. Water that is collected after cooling in the condenser section 23' is returned by way of line 25 and valve means 26, which are best shown in FIG. 2 of the drawing, into the upper end portion of the annular-form containment vessel 1. It should be noted that the present drawings are diagrammatic and that suitable couplings, union joints, or other pipe fittings, which may be required to assemble and to effect the connection of the tubular-form recombiner system with the containment vessel have not been shown.

In FIG. 1 of the drawing, there is merely shown an elongated extended surface area for the condenser portions 23 and 23', with such extended length and area under certain operating or installation conditions, perhaps being sufficient to provide adequate cooling of the vapor entering the condensation section; however, in certain installations or in a preferred embodiment, there may be the provision of additional surface area by utilizing longitudinal or circular fin means in combination with the tubing(s) of the condenser section. In FIG. 3 of the drawing, there is indicated longitudinal fin means 27 in connection with the larger diameter condenser portion 23 and peripheral or spiral type fin means 28 encompassing part of the condenser portion 23'. It is, however, not intended to limit the present improved embodiment to any one type of fin or any one type of cooler means to be utilized in combination with the condenser section of the unit. Also, in FIG. 3 there is indicated diagrammatically the placement of a Peltier type cooler 29 which can use electrical energy from wires 30 and 31 to provide cooling of at least a portion of the condenser section 23'. As heretofore noted, a Peltier type cooler may be of advantage in utilizing electrical current, in lieu of a heat exchange fluid, as a means for enhancing the cooling of at least a portion of the wall of the condenser section 23 or 23' and the electrical energy can be supplied by battery means where desirable.

Although the present drawing indicates the entire tubular-form recombiner system to be generally circular in nature, it is to be noted that the tubular-form system could be of a U-shape, generally rectangular or hexagonal, etc., and not necessarily limited to the partial circular form. The circular form unit is, of course, of advantage for use in combination with an annular-form containment vessel such as 1 but could well be of another configuration to accommodate other shapes or forms of containment vessels. It is, of course, a principal feature of the present embodiment to utilize a straight-through type of flow and the maintaining of the condensing section adjacent to and in general alignment with the outlet end of the reactor section. Additionally, whether or not the reactor and condenser sections are maintained in general alignment, there shall be a non-conductive heat barrier means provided between the two sections to preclude conduction of heat from the higher temperature section to the cooling section.

In FIG. 2 of the drawing it is noted that the entire tubular-form reactor-condenser system is generally horizontal, with a slight tipping toward the downstream end to enhance flow of resulting condensate back through tubing 25 into the containment vessel 1. However, with the utilization of a blower means 10, or other gas moving device, there may be a different placement or orientation of the reactor section. In other words, as long as positive flow may be provided for the $H_2$ and $O_2$ and the resultant water vapor into a condenser section, it is not necessary that the catalyst containing reactor section be horizontal, or in any specific position. Preferably, the cooling section or condensation section will have a downstream end below the inlet portion to permit gravity flow of condensate back into the containment vessel. Still other modifications with respect to construction and orientation will be obvious to those skilled in the art of providing catalyst retaining sections and with utilizing heating and cooling means in carrying out catalyst reactions.

I claim as my invention:

1. A compact tubular-form catalytic recombiner unit, particularly adapted to return resulting water condensate to the upper end of a containment vessel having radiologically formed $H_2$ and $O_2$, which comprises in combination:

a. a circular-form tubular reactor section having inlet and outlet means thereto and containing gas pervious all metal catalytic material for recombining $H_2$ and $O_2$;

b. a heater means in contact with the inlet end portion of said reactor section to heat incoming gaseous components;

c. a gas-vapor pumping means connective with the inlet means to said reactor section;

d. a circular tubular-form vapor condensation section directly adjacent to and in an insulated connection with the outlet end of said reactor section;

e. with said insulated connection incorporating at least one non-conductive barrier means interposed between the outlet of the reactor section and the inlet to said vapor condensation section;

f. cooling means connective with said vapor condensation section to provide for resulting liquid $H_2O$; and, g. condensate outlet means from the latter section whereby to return $H_2O$ to the containment vessel.

2. The tubular-form recombiner unit of claim 1 further characterized in that said all metal catalytic material is slidably placeable and removable from the interior of said circular-form tubular reactor section from one end thereof whereby there may be the placement and removal of said material.

3. The tubular-form recombiner unit of claim 1 further characterized in that a non-conducting gasket means is utilized between said reactor section and said vapor condensation section as said insulated connection means.

4. The tubular-form recombiner unit of claim 1 further characterized in that extended surface fin means are utilized along at least a portion of the length of said vapor condensation section to enhance cooling thereof.

5. The tubular-form recombiner unit of claim 1 further characterized in that a Peltier cooling means utilizing electrical energy is provided in contact with said vapor condensation section to enhance cooling thereof.

6. The tubular-form recombiner unit of claim 1 further characterized in that electrical heater means is utilized to supply heat for the inlet end portion of said reactor section and electrically powered blower means is provided in combination with the inlet means for said tubular reactor section to provide motive force for the gas stream being passed through said recombiner unit.

* * * * *